May 20, 1930.   W. H. OLDFIELD   1,759,321
COMBINATION T Y CONNECTION
Filed April 20, 1927
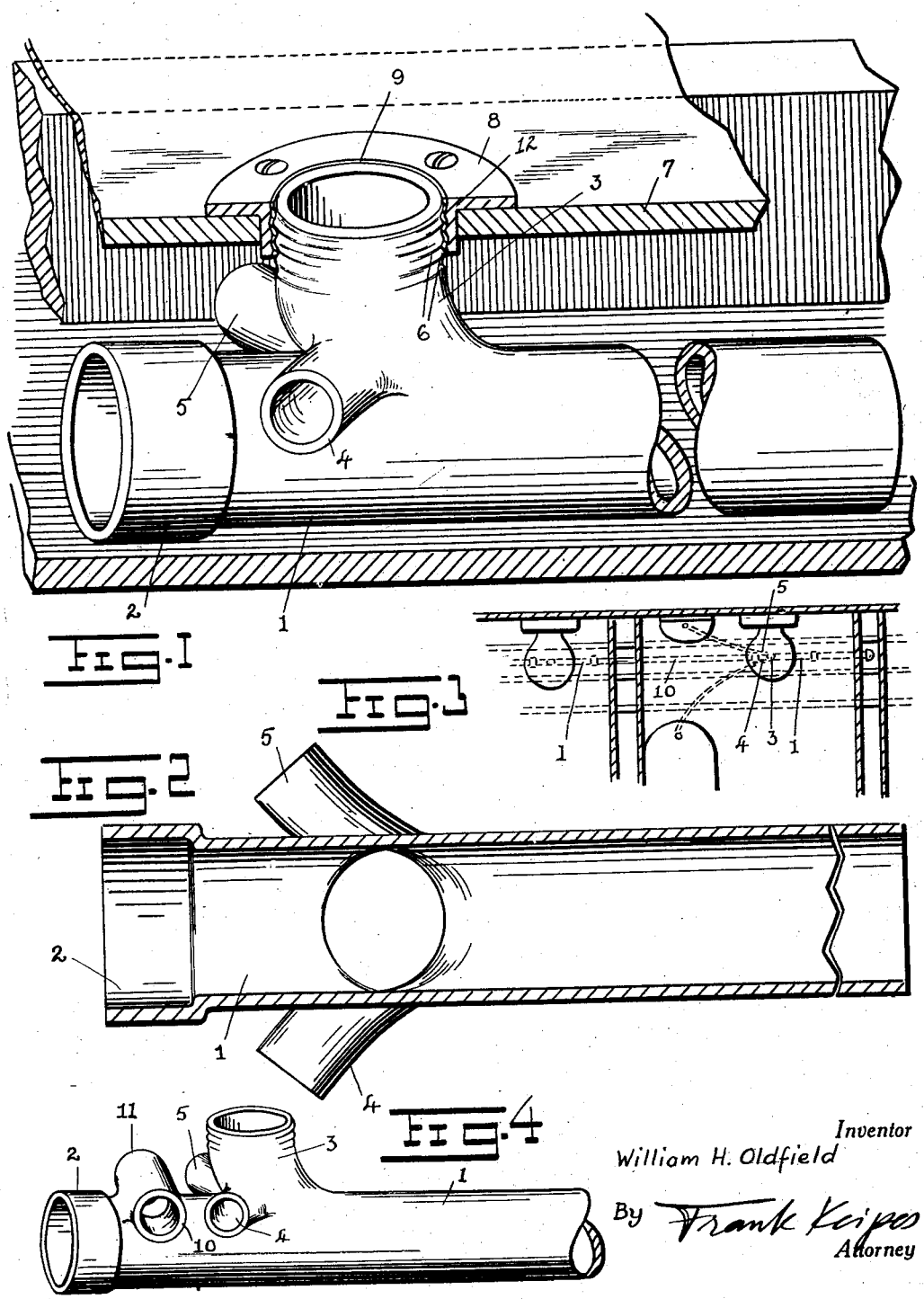
Inventor
William H. Oldfield
By Frank Keipos
Attorney Patented May 20, 1930

1,759,321

UNITED STATES PATENT OFFICE

WILLIAM H. OLDFIELD, OF ROCHESTER, NEW YORK

COMBINATION T Y CONNECTION

Application filed April 20, 1927. Serial No. 185,120.

This invention relates to pipe fittings especially closet connections that are used to connect one or more closets with a single waste pipe and the object of this particular pipe fitting is to provide a combined T and Y connection by means of which the waste pipe connection of several closets to a single waste pipe is materially simplified and requires less labor and material to install.

These and other objects of this invention will be fully illustrated in the drawing, described in the specification and pointed out in the claims at the end thereof.

In the accompanying drawing:

Figure 1 is a perspective view of the combined T Y closet connection as it appears located in the floor of a house.

Figure 2 is a horizontal sectional view of the T Y connection as viewed from the bottom.

Figure 3 is a diagrammatic view of the connection made with the combined T Y connection.

Figure 4 is a detail perspective view of a modified form of the T Y connection.

In the figures of the drawing like reference numerals indicate like parts.

The combination T Y closet connection forming the subject matter of this invention is intended for use in connecting one or more closets located on the same floor to the same waste pipe. This connection fills a long felt need in that any connection that has heretofore been used for this purpose necessitated the cutting up of the one or more of the joists supporting the floor, and involved considerable labor in making the connection. The T Y connection illustrated in the accompanying drawing is used without cutting any of the joists of the floor, and saves labor in that it simplifies the making of the connection.

As illustrated in Figure 1, the connection comprises the horizontal pipe 1 having the enlarged coupling sleeve 2 formed at the left hand end thereof. From the top of this pipe branches out the T connection comprising the upwardly curved pipe 3. The pipe 3 is curved in the direction of the water flowing thru the connection in order to prevent the connection from clogging up at the junction of the T connection.

In addition to the T connection formed by the pipe 3 a Y connection is formed into the horizontal pipe 1 by the curved pipes 4 and 5. These pipes are located one on each side of the pipe 3 and enter the pipe at opposite points at an elevation approximately in line with the top of the horizontal pipe 1. The pipes 4 and 5 are of a smaller diameter than the pipe 3 but curve in the same direction as the pipe 3. The pipes 4 and 5 are used to make connections with the bath tub and wash bowl in order to carry off the waste water from these two sources and direct them into the same waste pipe. The reason for the higher level for the inlets of the pipes 4 and 5 is to prevent the waste that passes off from the closets from backing up into these smaller pipes and clogging them up.

As illustrated diagrammatically in Figure 3 the use of the T Y connection permits the locating of the waste pipe between two joists and directly underneath the outlet of the closet so that the closet can be mounted directly above and in line with the T connection 3. For this reason the upper end of the pipe 3 is provided with a series of concentric ridges or flutes 6, 6. The fluted portion of this pipe is adapted to project thru the floor 7 so that the connecting flange 8 of the shoe 12 can be slipped over it to finish off the top of the pipe 3 above the floor ready to have the closet mounted thereon. The joint between the inside of the flange and the fluted circumference of the pipe 3 is made tight by calking suitable packing 9 between them.

After connection with one closet has been made, the waste pipe is continued with a pipe 10 that connects into the enlarged coupling sleeve 2. A second T Y connection is then added to the end of the pipe 10 at the point where another closet is to be connected to the waste pipe. This may be continued for any number of closets that are to be provided on the same floor and are to be connected to the same waste pipe.

In the modified form of the connection illustrated in Figure 4 an additional pair of outlets 10 and 11 are provided. Either one or the other of these outlets is adapted to have a vent pipe connected thereto doing away with a special fitting that is now needed for the connection of a vent pipe into the waste pipe line. The outlet 10 or 11 that is not used is closed with a suitable plug.

I claim:

1. In a combined T Y connecting pipe, the combination of a horizontal section, a vertical T section branching from the top of said horizontal section, a pair of Y sections branching from the side of said vertical T section at an elevation partially above the top of said horizontal section and above its central line so as to provide the discharge openings of said Y sections partially in said vertical section and partially in said horizontal section.

2. In a combined T connecting pipe, the combination of a horizontal section, a vertical T section branching from the horizontal section and intermediate at the ends thereof, said T section being finished at the top with a series of flutes and being adapted to receive a shoe placed around it, lateral sections branching from the sides of said vertical T section so as to place the discharge openings of said lateral sections partially in said vertical section and partially in said horizontal section.

In testimony whereof I affix my signature.

WILLIAM H. OLDFIELD.